March 22, 1932. R. G. FEAR 1,850,955
CAM AND ROCKER ARM INTERMITTENT MOVEMENT
Filed Feb. 5, 1929 2 Sheets-Sheet 1
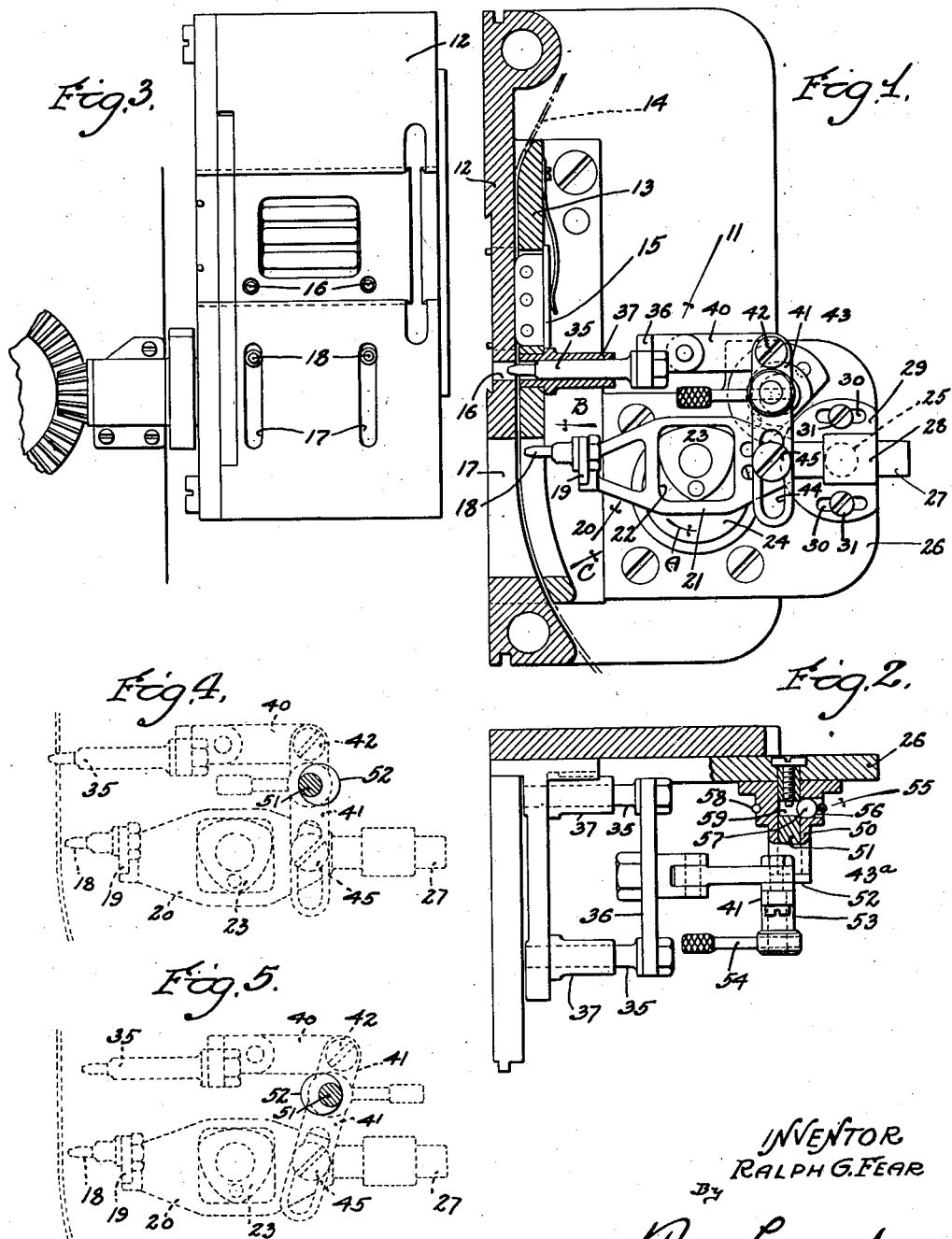
INVENTOR
RALPH G. FEAR
ATTORNEY

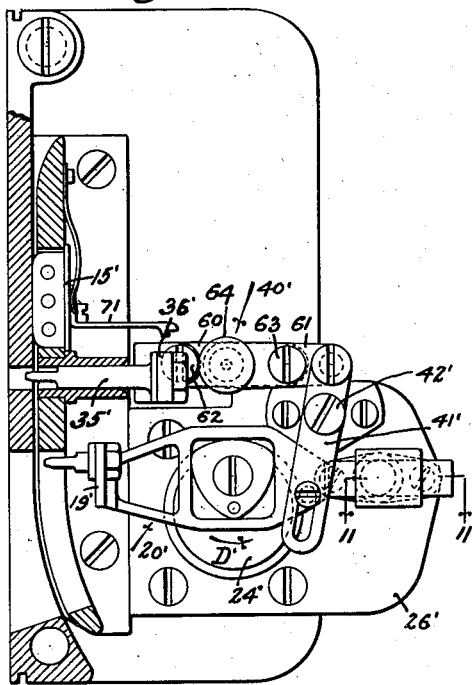
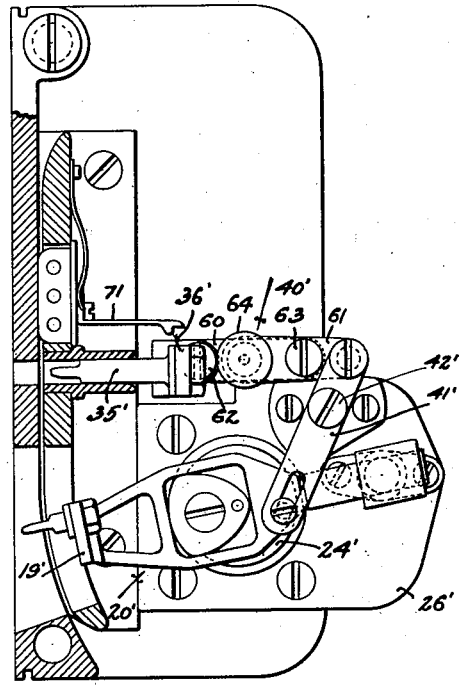
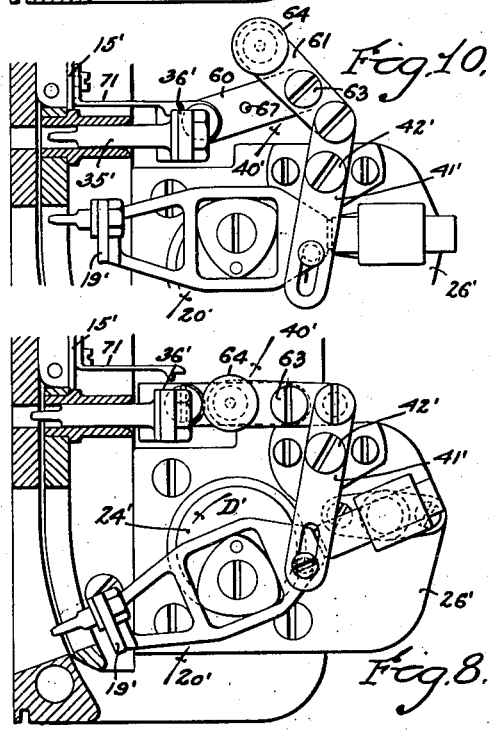
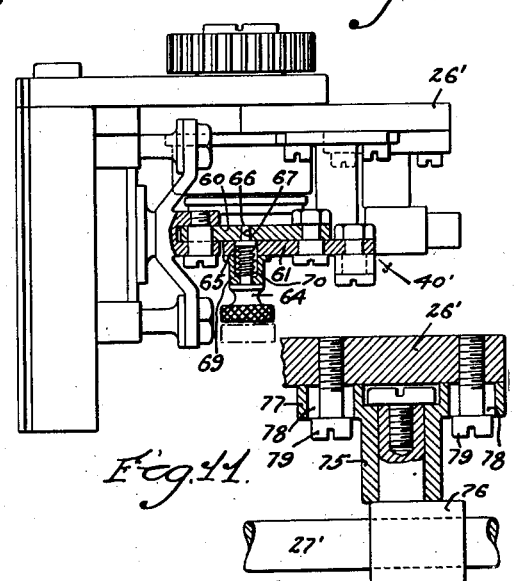

UNITED STATES PATENT OFFICE

RALPH G. FEAR, OF HOLLYWOOD, CALIFORNIA

CAM AND ROCKER ARM INTERMITTENT MOVEMENT

Application filed February 5, 1929. Serial No. 337,700.

It is well known to those familiar with the motion picture art, that it is necessary in advancing the film in photographing or the projecting operation, to effect such advancement intermittently and to have a maximum period of rest between each of the intermittent advances of the film. Many mechanisms have been developed to obtain this movement, some of them including a so-called harmonic cam which is designed to give a movement which is slow to start, has a maximum point during the center of the movement and then slows down before the linear movement is stopped.

It is a primary object of this invention to produce a mechanism of the class described which includes such a cam associated with other novel means for effecting results to be hereinafter specified.

The essential elements in a film moving mechanism for a motion picture camera include a so-called shuttle fork which is to impart linear advancement to the film and a pilot pin member which is adapted to engage the perforations of the film and hold it stationary during a return movement of the shuttle fork.

It is important in an organization of this character that the pilot pins be withdrawn from the perforations of the film while the pins in the shuttle fork are entering perforations in the film and likewise the pilot pin must enter perforations in the film while the shuttle fork is being withdrawn at the termination of an advance or linear movement which the shuttle fork imparts to the film.

It is important therefore that these two movements should be synchronized and various means have been devised for the synchronization of the movement of the shuttle fork and the pilot pin. The mechanism for accomplishing this result ordinarily consists of a plurality of cams or a series of sliding members associated to produce the desired result.

It is a primary object of this invention to produce a mechanism of the class described which embodies novel means for synchronizing the movement of the pilot pin and the shuttle fork and it is a noteworthy feature of this mechanism that it comprises a minimum number of moving parts consisting merely of a pivoted rocker arm which is adapted to receive intermittent angular movement from the shuttle fork and which is associated with a link member through which the rocker arm imparts lateral movement to the pivot pin.

It is important for the purpose of conveniently inserting or threading a film into a mechanism of this character to provide means whereby both the shuttle fork pins and the pilot pins are in a non-engaging position relative to the path of the film and it is therefore a further object of this invention to provide a novel mechanism whereby the pilot pin may be moved laterally independently of any movement in the shuttle fork. This is accomplished by moving the link member which is associated with the pilot pins in a rearward direction relative to the path of the film, such movement being obtained either by shifting the fulcrum or pivot point of the rocker arm rearwardly or by making the connecting link in the form of a broken link whereby it may optionally be made to function as a hinge and to thereby impart a sliding movement to the pilot pins which movement is independent of any motion in the shuttle fork. This construction also makes possible the operation of the shuttle fork without the pilot pins engaging the films, an optional feature of adaptability not found in ordinary camera constructions, which increase the field of use of my invention.

It is also an object of this invention to provide means for varying the throw of the shuttle fork in order that the mechanism may be readily adjusted to compensate for any shrinkage in the film or to adapt the mechanism for use in connection with film which is provided with perforations that are not standard.

It is a noteworthy feature of this invention that the mechanism embodies a minimum number of moving parts which is obviously important in view of the fact that any wear in the parts will throw the organization out of the very fine adjustment which is necessary in machines of this character. It follows therefore that this invention embodies an intermittent motion mechanism which is of simple form and construction and may be readily assembled and operated.

Details in the construction of a preferred form of this invention together with other objects attending its production will be better understood from the following description of the accompanying drawings in which Fig. 1 is an elevational view partly in section showing a preferred embodiment of my invention.

Fig. 2 is a partial plan view having parts broken away to illustrate the means for adjusting the pilot pin.

Fig. 3 is a face view illustrating an aperture plate such as may be used in combination with my invention.

Figs. 4 and 5 are somewhat diagrammatic views illustrating the construction and the operation of the pilot pin adjusting means.

Figs. 6 to 8 inclusive are elevational views illustrating the various steps through which the shuttle fork and pilot pin are moved in the operation of my invention. These views illustrate a modified form of pilot pin link mechanism whereby movement may be imparted to the pilot pin independently of any movement in the shuttle fork.

Fig. 9 is a plan view partly broken away to illustrate the details in the construction of an alternate form of link mechanism such as is illustrated in Figs. 6 to 8 inclusive.

Fig. 10 is a partial elevation illustrating the parts of the pilot pin link as being arranged in a position of disengagement.

Fig. 11 is a detailed section which may be considered as having been taken substantially in a plane represented by the line 11—11 in Fig. 6 and illustrates the manner of adjusting the mechanism to vary the throw of a shuttle fork.

More particularly describing the invention as herein illustrated, reference numeral 11 indicates an intermittent movement mechanism of the class described which is illustrated as being associated with a motion picture camera embodying an aperture plate 12 and a guide plate 13 spaced from the aperture plate in such a manner as to admit the reception of a motion picture film indicated by reference numeral 14.

The guide plate 13, which may be of the well known construction used in the motion picture cameras includes a pressure plate 15 and is provided with two oppositely disposed apertures indicated at 16 and two oppositely formed longitudinal recesses indicated at 17.

The longitudinal recesses 17 are adapted to receive film moving pins 18 which are mounted upon the bifurcate head 19 of a shuttle fork 20.

The shuttle fork 20 is illustrated as embodying a central frame section 21 which is provided with a square aperture 22 adapted to receive a harmonic cam 23.

The cam 23 is mounted upon a rotating member 24, and the shuttle fork 20 being pivoted at 25, it will be understood that the rotation of the rotatable member 24 in the direction of the arrow A, is effective to first move the shuttle fork in the direction of the arrow B into engagement with perforation in the film and to then carry the fork downwardly subsequently moving it in the direction of the arrow C away from the film and returning it to the position shown in Fig. 1.

It will be understood that although the harmonic cam is illustrated as being the preferred manner of imparting this movement to the shuttle fork, that a satisfactory effect may be obtained by merely attaching the shuttle fork eccentrically to the rotatable member 24 or by providing any other form of cam mechanism which will produce the desired movement.

The preferred manner of pivotally mounting the shuttle fork upon a fixed supporting plate 25 is illustrated as comprising a rearwardly extending sliding pin 27 which is slidably supported in a bearing member 28, the bearing member 28 being rotatably mounted upon a pivot plate 29. It was mentioned previously in the specification as a noteworthy feature of this invention that means are provided for adjusting the throw of the shuttle fork, such means are illustrated as embodying longitudinal apertures 30 through which plate 29 is adapted to be held upon the supporting plate 26 by means such as the screws 31.

It has been previously pointed out that means are provided for holding the film stationary while the film moving pins are out of engagement with the perforations in the film, such means are illustrated as embodying pilot pins 35 which are mounted upon a bifurcate pilot pin head 36 and are adapted to be received by bearing sleeves 37 which are arranged in coaxial relation with pilot pin receiving apertures 16 in the guide plate and the aperture plate. For the purpose of imparting synchronous lateral movement to the pilot pins 35 during a corresponding but opposite movement in the shuttle fork 20, the pilot pin supporting head 36 is illustrated as being associated with a link member 40 which is pivotally connected with a rocker arm 41 as indicated at 42.

The rocker arm 41 has its fulcrum or pivot point upon the fixed supporting plate 26 at 43 and the lower end of this rocker arm is provided with a longitudinal slot 44 which receives a suitable guide pin 45 mounted upon the shuttle fork 20.

It will be understood from this construction that when the shuttle fork 20 moves toward the film 14, the pilot pins are drawn away from the film and that the slot 44 is so arranged relative to the guide pin 45 that the pilot pins are held in this relative position until the shuttle fork 20 is moved away from the film at which time the pilot pins are moved toward the film.

As has been pointed out, it is necessary in order to conveniently thread the camera or insert a film therein, to provide means whereby the pilot pins may be moved independently of the shuttle fork. In the form of the invention illustrated in Figs. 1 and 2 and 4 and 5, this is accomplished by arranging the pivot or fulcrum 43 of the rocker arm 41 upon an eccentric so that the pivot point may be rotated through substantially 180° thereby moving the pilot pin bodily to the two positions shown in Figs. 4 and 5. It is obvious that when pilot pins are shifted out of position as shown in Fig. 5, that the shuttle fork may be operated without the pilot pins engaging the film.

The construction by means of which this movement is accomplished, is perhaps best illustrated in Fig. 2 as comprising a fixed sleeve member 50 which is mounted upon the supporting plate 26 and through which a rotatable pin member or shaft 51 extends. The outer end of the shaft 51 is provided with an eccentric head 52 which is adapted to receive the pivot or fulcrum pin 43a that supports the rocker arm 41.

The eccentric head 52 may be provided with an outwardly extending projection 53 which carries a handle 54 by means of which the eccentric head may be easily rotated.

In order that the pin 51 may be easily rotated to and held in the two 180° positions shown in Figs. 4 and 5, I provide holding means generally indicated by reference numeral 55 as comprising an aperture 56 in the bearing member 50 which is adapted to receive a ball or plunger 57, the ball being held therein in any suitable manner such as by means of a spring or split ring indicated at 58.

A hole 59 (or a pair of oppositely disposed recesses) is placed upon the shaft 51 in a manner such that the two opposite ends of the hole will receive the ball 57 when the shaft is rotated from one to the other of the 180° positions. It will be apparent that such a construction admits the movement of the eccentric fulcrum head 52 and at the same time provides means whereby the organization is held firmly in either one of the two oppositely disposed positions of adjustment.

Figs. 6, 9 and 10 illustrate a modified form of construction for imparting the lateral adjustment to the pilot pin. In this construction parts which are similar to those described in connection with Fig. 1 are indicated by the same reference numerals distinguished by the prime marks and the rocker arm 41' is illustrated as being mounted upon the fixed supporting plate 26' by means of a fixed pivot pin 42' and the link member 40' which is pivotally connected by the bifurcate head 36' is illustrated as being in the form of a broken link consisting of segments 60 and 61 which are pivotally connected with each other at 62 and 63.

For the purpose of optionally holding the segments 60 and 61 in fixed position relative to each other, I provide a sliding pin 64 upon one of the segments (61) which extends through an aperture 65 and has a projection 66 adapted to be received by a cooperating aperture 67 formed in the other of the segments (60).

The pin 64 is illustrated as being received in a sleeve 69 and is associated with a spring member 70 which is adapted to force it toward the position shown in Fig. 9.

When it is desired to move the pilot pin into position for threading the camera with film, it will be understood that the pin 64 is drawn to the dot and dash line position shown in Fig. 9 and the segment 61 is lifted to the position shown in Fig. 10. This movement is effective to move the bifurcate head 36' and the pilot pins 35' laterally into the position shown in Fig. 10, and is entirely independent of any movement in the shuttle fork 20'.

It is obvious the film may be threaded any time at which the shuttle fork pins are not in the film slot or race-way, and in order that the shuttle fork may, if desired, be operated independently of the pilot pins, a spring member 71 is mounted by a slot and screw connection upon the back of the pressure plate 15' and may be used to hold the guide pin assembly in the position shown in Fig. 10 during the operation of the shuttle fork.

Figs. 6, 7 and 8 illustrate various positions which may be assumed by the shuttle fork and the pilot pin in both forms of my invention during the advancement of a film in the camera. Fig. 6 shows the pilot pin engagement with the perforations of the film and the shuttle fork in a position just prior to the entrance of the film moving pins into the film perforations. The forward movement of the shuttle fork which is effected by the rotation of the rotatable member in the direction of the arrow D', withdraws the pilot pins into the position in Fig. 7 and during the continued rotation of the rotatable member, the film moving pins are carried down to the positions shown in Fig. 8. This figure illustrates the film moving pins as being removed from the perforations in the film along a substantially straight line and illustrates the pilot pin as entering the perforations in the film, such movement also being in a straight line.

Fig. 11 illustrates the manner in which the shuttle fork 20' is pivoted to the supporting plate 26' for adjusting the throw of the shuttle fork. This support is illustrated as comprising a supporting member 75 which receives a sleeve member 76 adapted to slidably receive the pin 27' on the shuttle fork.

The base 77 of the support 75 is illustrated as being provided with oppositely disposed longitudinal recesses 78 which receive supporting pins or screws 79, the screws 79 being in threaded engagement with the fixed supporting plate 26'.

It will be understood that this construction admits the transverse movement of the pivot point or fulcrum for the shuttle fork, such movement being effective to vary the throw of the shuttle fork to accommodate for shrinkage in the film or variations in the perforations between different forms of stock as has been previously pointed out.

It will be apparent from the foregoing description that this invention embodies a novel mechanism for producing intermittent motion which is particularly adapted for use in connection with motion picture film handling machines and although I have herein described and illustrated one preferred embodiment of the invention and indicated various modifications in certain of the novel features, it will be understood that the invention is not limited to the precise construction set forth or to any one of the combinations described, but that it includes within its scope whatever changes fairly come within the spirit of the appended claims.

I claim as my invention:

1. A movement mechanism for use in combination with an aperture plate embodying: a rotatable member; a shuttle fork; means interposed between said shuttle fork and said rotatable member for imparting lateral and transverse movements to said shuttle fork relative to said aperture plate; a pilot pin; and a rocker arm associated with said shuttle fork and said pilot pin and provided with a pin and slot connection for imparting opposed transverse oscillations from said shuttle fork to said pilot pin.

2. A movement mechanism for use in combination with an aperture plate embodying: a rotatable member; a shuttle fork; a cam member eccentrically mounted on said rotatable member and associated with said shuttle fork for imparting lateral and transverse movements to said shuttle fork relative to said aperture plate; a pilot pin; and a rocker arm associated with said shuttle fork and said pilot pin and provided with a pin and slot connection for imparting opposed transverse oscillations from said shuttle fork to said pilot pin.

3. A movement mechanism for use in combination with an aperture plate embodying: a rotatable member; a shuttle fork; means interposed between said shuttle fork and said rotatable member for imparting lateral and transverse movements to said shuttle fork relative to said aperture plate; a pilot pin; a rocker arm associated with said shuttle fork and said pilot pin and provided with a pin and slot connection for imparting opposed transverse oscillations from said shuttle fork to said pilot pin; and means for moving said pilot pin independently of said shuttle fork.

4. A movement mechanism for use in combination with an aperture plate embodying: a rotatable member; a shuttle fork; means interposed between said shuttle fork and said rotatable member for imparting lateral and transverse movements to said shuttle fork relative to said aperture plate; a pilot pin; a rocker arm associated with said shuttle fork and said pilot pin and slot and provided with a pin connection for imparting opposed transverse oscillations from said shuttle fork to said pilot pin; and means comprising an eccentric fulcrum in said rocker arm for moving said pilot pin independently of said shuttle fork.

5. A movement mechanism for use in combination with an aperture plate embodying: a rotatable member; a fixed supporting member; a shuttle fork; means for slidably and pivotally supporting said shuttle fork on said fixed supporting member; means interposed between said shuttle fork and said rotatable member for imparting lateral and transverse movements to said shuttle fork relative to said aperture plate; a pilot pin; and a rocker arm associated with said shuttle fork and said pilot pin and provided with a pin and slot connection for imparting opposed transverse oscillations from said shuttle fork to said pilot pin.

6. A movement mechanism for use in combination with an aperture plate embodying: a rotatable member; a fixed supporting member; a shuttle fork; means for pivotally supporting said shuttle fork on said fixed supporting member; means interposed between said shuttle fork and said rotatable member for imparting lateral and transverse movement to said shuttle fork relative to said aperture plate; a pilot pin; and a rocker arm associated with said shuttle fork and said pilot pin and provided with a pin and slot connection for imparting opposed transverse oscillations from said shuttle fork to said pilot pin, and means for imparting transverse adjustment to said shuttle fork pivot.

7. A movement mechanism for use in combination with an aperture plate embodying: a rotatable member; a fixed supporting member; a shuttle fork slidably and pivotally mounted on said fixed supporting member; means eccentrically associated with said rotatable member for imparting transverse and longitudinal oscillations to said shuttle fork relative to said aperture plate; a pilot pin; a rocker arm having a fulcrum supported by said fixed supporting member and associated with said shuttle fork through a pin and slot connection; and a link connecting said rocker arm with said pilot pin.

8. A movement mechanism for use in combination with an aperture plate embodying: a rotatable member; a fixed supporting member; a shuttle fork slidably and pivotally mounted on said fixed supporting member; means eccentrically associated with said rotatable member for imparting transverse and longitudinal oscillations to said shuttle fork relative to said aperture plate; a pilot pin; a rocker arm having a fulcrum supported on said fixed supporting member and associated with said shuttle fork through a pin and slot connection; a link connecting said rocker arm with said pilot pin; and means associated with said link and said rocker arm for moving said pilot pin independently of said shuttle fork.

9. A movement mechanism for use in combination with an aperture plate embodying: a rotatable member; a fixed supporting member; a shuttle fork slidably and pivotally mounted on said fixed supporting member; means eccentrically associated with said rotatable member for imparting transverse and longitudinal oscillations to said shuttle fork relative to said aperture plate; a pilot pin; a rocker arm having a fulcrum supported by said fixed supporting member and associated with said shuttle fork through a slot and pin connection; a link connecting said rocker arm with said pilot pin; said rocker arm fulcrum comprising a fixed sleeve member, a shaft rotatably mounted in said sleeve member, a head formed on said shaft; and a pivot pin eccentrically mounted in said head and adapted to support said rocker arm.

10. A movement mechanism for use in combination with an aperture plate embodying: a rotatable member; a fixed supporting member; a shuttle fork slidably and pivotally mounted on said fixed suporting member; means eccentrically associated with said rotatable member for imparting transverse and longitudinal oscillations to said shuttle fork relative to said aperture plate; a pilot pin; a rocker arm having a fulcrum supported on said fixed supporting member and associated with said shuttle fork through a slot and pin connection; a link connecting said rocker arm with said pilot pin, said rocker arm fulcrum comprising a fixed sleeve member, a shaft rotatably mounted in said sleeve member, a head formed on said shaft; a pivot pin eccentrically mounted in said head and adapted to support said rocker arm and means for imparting rotative adjustment to said shaft.

11. A movement mechanism for use in combination with an aperture plate embodying: a rotatable member; a fixed supporting member; a shuttle fork pivotally mounted on said fixed supporting member; means eccentrically associated with said rotatable member for imparting transverse and longitudinal oscillations to said shuttle fork relative to said aperture plate; a pilot pin; a rocker arm having a fulcrum supported by said fixed supporting member and associated with said shuttle fork through a slot and pin connection; a link connecting said rocker arm with said pilot pin, said rocker arm fulcrum comprising a fixed sleeve member, a shaft rotatably mounted in said sleeve member, a head formed on said shaft, a pivot pin eccentrically mounted in said head and adapted to support said rocker arm, means for imparting rotative adjustment to said shaft, and means for yieldably holding said shaft in two diametrically opposed positions of adjustment.

12. A movement mechanism for use in combination with an aperture plate embodying: a rotatable member; a shuttle fork; means interposed between said shuttle fork and said rotatable member for imparting lateral and transverse movements to said shuttle fork relative to said aperture plate; a pilot pin; a rocker arm associated with said shuttle fork and said pilot pin and provided with a pin and slot connection for imparting opposed transverse oscillations from said shuttle fork to said pilot pin; and means for selectively placing said pilot pin in an operative or an inoperative position relative to said aperture plate.

13. A movement mechanism for use in combination with an aperture plate; a rotatable member; a shuttle fork adapted to move a film longitudinally relative to said aperture plate; means interposed between said shuttle fork and said rotatable member for imparting lateral and transverse oscillations to said shuttle fork; a pilot pin; means associated with said shuttle fork for imparting opposed transverse oscillations from said shuttle fork to said pilot pin; and means for selectively placing the pilot pins into film engaging or non-engaging positions.

In testimony whereof, I have hereunto set my hand at Los Angeles, California, this 22 day of January, 1929.

RALPH G. FEAR.